(12) United States Patent
Mangoubi et al.

(10) Patent No.: US 9,858,661 B2
(45) Date of Patent: Jan. 2, 2018

(54) DETECTING SPECIES DIVERSITY BY IMAGE TEXTURE ANALYSIS

(71) Applicants: The Charles Stark Draper Laboratory, Inc., Cambridge, MA (US); University of Florida Research Foundation, Inc., Tampa, FL (US)

(72) Inventors: Rami Mangoubi, Newton, MA (US); Matteo Convertino, Gainesville, FL (US); Nathan Lowry, Lexington, MA (US); Mukund Desai, Needham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 14/304,531

(22) Filed: Jun. 13, 2014

(65) Prior Publication Data

US 2014/0369568 A1 Dec. 18, 2014

Related U.S. Application Data

(60) Provisional application No. 61/834,665, filed on Jun. 13, 2013.

(51) Int. Cl.
*G06K 9/00* (2006.01)
*G06T 7/00* (2017.01)
*G06T 7/40* (2017.01)

(52) U.S. Cl.
CPC ............ *G06T 7/0012* (2013.01); *G06T 7/401* (2013.01); *G06T 2207/10024* (2013.01); *G06T 2207/10032* (2013.01); *G06T 2207/10056* (2013.01); *G06T 2207/30016* (2013.01); *G06T 2207/30024* (2013.01); *G06T 2207/30188* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,583,972 A | * | 12/1996 | Miller | .................. G01S 13/951 324/640 |
| 2010/0040260 A1 | * | 2/2010 | Kelle | ....................... A01G 1/00 382/110 |
| 2011/0043603 A1 | * | 2/2011 | Schechner | ............. G06T 5/003 348/25 |
| 2011/0170751 A1 | | 7/2011 | Mangoubi et al. | |
| 2011/0188728 A1 | | 8/2011 | Sammak et al. | |
| 2012/0021429 A1 | * | 1/2012 | Rublee | .................. C12Q 1/689 435/6.12 |

(Continued)

*Primary Examiner* — Alex Liew
(74) *Attorney, Agent, or Firm* — Christopher J. McKenna; Foley & Lardner LLP

(57) ABSTRACT

A method of measuring species diversity is provided. The method includes receiving a first image of a landscape and receiving a second image of a second landscape. The method also includes representing a portion of the first image as a first region of interest comprising a multiplicity of pixels and representing a portion of the second image as a second region of interest comprising a multiplicity of pixels. The method further includes comparing at least one textural feature of the first region of interest and the second region of interest and calculating the species diversity between the first landscape and the second landscape based on the comparison of the at least one textural features of the regions of interest.

24 Claims, 9 Drawing Sheets

(56) References Cited

U.S. PATENT DOCUMENTS

2012/0065518 A1* 3/2012 Mangoubi ............... A61B 3/12
  600/473
2013/0207975 A1 8/2013 Mangoubi et al.

* cited by examiner

DETECTING SPECIES DIVERSITY BY IMAGE TEXTURE ANALYSIS

CROSS-REFERENCE TO RELATED PATENT APPLICATIONS

This application claims the benefit of and priority to U.S. Provisional Application No. 61/834,665, filed Jun. 13, 2013, which is incorporated herein by reference in its entirety.

BACKGROUND

Currently, assessment of biodiversity at various scales often relies on sample-sorting or fieldwork-based data collection methodology. Species assessment in relatively large or weakly accessible areas, assessment of microscopic flora and fauna in biological samples and assessment of geological species diversity across large landscapes are a time-consuming and challenging tasks for ecologists, biologists and geologists. Key factors need to be determined before a sampling design for species diversity analysis is ready for implementation, such as: (i) the number of sampling units; (ii) the spatial placement of the sampling units; (iii) clear definition of the statistically meaningful species of concern; and, (iv) an operational definition of a species community (microscopic or macroscopic). Moreover, sample-based and field-based approaches are typically labor intensive and costly, and only a small fraction of a study area may be sampled.

SUMMARY

According to one aspect of the disclosure, a system for measuring species diversity includes an image analysis module configured to receive an image of a landscape and represent a portion of the image as a region of interest comprising a multiplicity of pixels. The image analysis module is further configured to process the region of interest by a texture analysis module. The texture analysis module is configured to calculate at least one textural feature of the region of interest. The image analysis module is also configured to process the at least one textural feature by a species diversity calculator. The species diversity calculator is configured to calculate the species richness of the landscape based on the at least one textural feature.

According to another aspect of the disclosure, a system for measuring species diversity includes an image analysis module configured to receive a first image of a first landscape, receive a second image of a second landscape. The image analysis module is configured to represent a portion of the first image as a first region of interest comprising a multiplicity of pixels and represent a portion of the second image as a second region of interest comprising a multiplicity of pixels. The image analysis module is further configured to process the first region of interest and the second region of interest by a texture analysis module, configured to calculate at least one textural characteristic of each region of interest. The image analysis module is also configured to process the textural characteristics of each region of interest by a species diversity calculator, configured to calculate the species diversity between the first landscape and the second landscape based on the textural features.

According to another aspect of the disclosure, a method of measuring species richness includes receiving an image of a landscape and representing a portion of the image as a region of interest comprising a multiplicity of pixels. The method further includes calculating at least one textural feature of the region of interest and calculating species richness based on the at least one textural feature of the region of interest.

According to another aspect of the disclosure, a method of measuring species diversity includes receiving a first image of a landscape and receiving a second image of a second landscape. The method also includes representing a portion of the first image as a first region of interest comprising a multiplicity of pixels and representing a portion of the second image as a second region of interest comprising a multiplicity of pixels. The method further includes comparing at least one textural feature of the first region of interest and the second region of interest and calculating the species diversity between the first landscape and the second landscape based on the comparison of the at least one textural features of the regions of interest.

DETAILED DESCRIPTION

Following below are descriptions of various concepts related to, and implementations of, methods, and systems for measuring species diversity by image analysis. The various concepts introduced above and discussed in greater detail below may be implemented in any of numerous ways, as the described concepts are not limited to any particular manner of implementation. Examples of specific implementations and applications are provided primarily for illustrative purposes.

Species diversity describes the number of species that are represented in a dataset, for example a landscape. A landscape, as used herein, can refer to a macroscopic landscape or a microscopic landscape and the species represented in the landscape are the flora and fauna of the landscape. Species diversity includes α-diversity of species, also known as species richness as well as β-diversity, also known as species turnover. Species richness refers to the number of different species represented in the landscape. Species turnover refers to a change in species richness in the landscape. B-diversity can also be used to compare diversity between different landscapes.

Texture analysis of images provides the ability to extract information and accurately analyze images acquired through readily available devices and techniques. For example, high-resolution satellite imagery provides detailed spatial characteristics over large areas of ecosystems and offers a promising potential for accurate vegetation mapping. However, most multispectral image classification techniques more commonly focus on spectral discrimination of objects for single-species detection, and may overlook pertinent information extractable through analysis of spatial or spatiotemporal pixel intensity variation residing in images. β-diversity is an important measure of species dissimilarity between communities or over time within the same community. Besides the pairwise species dissimilarity, species-turnover, or β diversity, reflects the change of environmental variations, such as of rainfall and soil, as dictated by either natural events, anthropic events, or both.

Measurement of species diversity by texture analysis of images of a landscape allows frequent, low-cost analysis of ecosystems. Texture analysis is based on the variation of pixel intensities across an analyzed image of a landscape.

Figure 1:
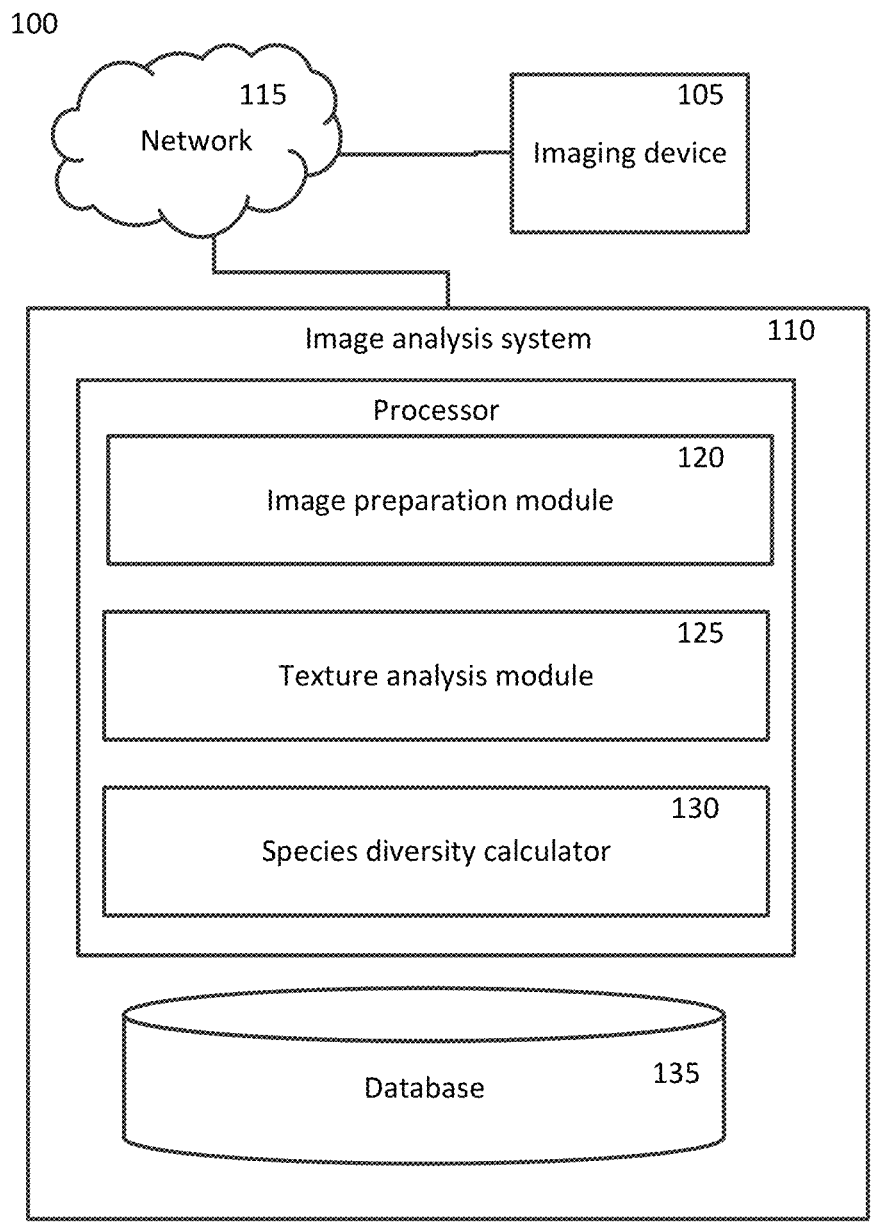
FIG. 1 is a schematic drawing of an example system for measuring species diversity.

FIG. 1 is a schematic diagram of a computer implemented system for species diversity measurement 100. The species diversity measurement system 100 includes an imaging device 105 for acquiring an image of a landscape. The species diversity measurement system 100 also includes an image analysis system 110 for processing an image acquired via the imaging device 105. The species diversity measurement system can include a network 115 that the image analysis system 110 and the imaging device 105 are both connected to. The image analysis system 110 includes an image preparation module 120 configured to receive an image and prepare the image for analysis. The image analysis system 110 also includes a texture analysis module 125 for performing textural analysis on the prepared image. The image processing system 110 further includes a database 135 of image texture and species diversity data and a species diversity calculator 130 for calculating the species diversity of landscapes based on the textural analysis.

A landscape may refer to a portion of a surface at any scale of physical space. In some implementations the landscape can be at a microscopic scale suitable to visualize cells in a two-dimensional image. For example, the landscape can be a portion of a surface having an area of one square centimeter or smaller. In other implementations the landscape can be at a macroscopic scale to visualize features of a geographic area of the surface of the earth. As examples, features of a geographic area can include ecological features such as the flora and fauna of a geographic area. Features of a geographic area can also include geological features of the area. In such implementations, the area of the landscape can be tens, hundreds, thousands or more square meters. In yet other implementations, a landscape can refer to an imaging plane within a biological sample such as an imaging plane of an MRI image or any other tomographic image. In such implementations, the landscape is analyzed for diversity of species of cell types or tissue properties that are characterized by varying imaging characteristics. For example, an imaging plane of an MRI image of a brain may be analyzed for species of grey or white matter cells containing varying concentrations of lipids. The landscapes can also be at any scale between the above-mentioned microscopic and macroscopic scales, having an area anywhere between one square centimeter and thousands of square meters.

The imaging device 105 can be one of many different types of devices capable of acquiring an image of a landscape. For example, the imaging device 105 can be a satellite imaging device capable of acquiring images of large-area landscapes, such as those used to populate the Landsat Imagery Database. In some other implementations the imaging device 105 can be a digital single lens reflex (DSLR) camera. The imaging device 105 can also be an imaging device capable of acquiring images of small-area landscapes, such as one of many types of microscopes including compound microscopes, stereo microscopes, confocal laser scanning microscopes, x-ray microscopes or any other suitable microscopic imaging device for imaging small-area landscapes. In other implementations, the imaging device 105 can be an imaging device capable of non-invasive medical imaging of a biological subject. For example, the imaging device 105 can be a magnetic resonance imaging (MRI) machine, x-ray computed tomography (CT) machine, an ultrasound machine or any other type of medical imaging device.

As illustrated, the species diversity measurement system 100 includes a network 115 that connects an imaging device to the image analysis system 110. In some implementations, the network 115 includes a local area network (LAN), a wide area network (WAN), wireless area networks, intranets, and other communication networks such as mobile telephone networks, the Internet, any virtual private network or a combination thereof. In some implementations, the imaging device 105 is not connected to the image processing system 105. In such implementations, the imaging device 105 can be a stand-alone imaging device and images can be transferred to the image processing system without being transmitted via a network 115.

The image processing system 110 included in the species diversity measurement system 100 can be implemented on one or more computing devices. The components of the image processing system described herein can be implemented as a combination of hardware and software. For example, a component can be implemented as computer readable instructions stored on a tangible computer readable medium. When the computer executable instructions are executed by a processor such as the processor of a general purpose computer, the instructions cause the processor to carry out the functionality of the respective components described further below.

The image processing system 110 includes an image preparation module 120. The image preparation module 120 can be implemented on one or more processors 140 included in the image processing system 110. The image preparation module 120 is configured to receive a digital image of a landscape from the imaging device 105. In some implementations, the image preparation module receives the image from the imaging device 105 via the network 115, or from some other digital storage device, database, or memory. The image preparation module 120 provides a user interface for a user to select a portion of the image to be included in a region of interest. The portion of the image may be selected to exclude imaging artifacts or obscuring features in the image. An example of an obscuring feature in an image of a large-area landscape is cloud coverage. In this example, clouds may obscure the landscape to be analyzed and a portion of the image containing no clouds or minimal clouds may be selected as the region of interest. Imaging artifacts may include image distortion, image striping, ghosting or other image artifacts caused by image acquisition or image reconstruction by the imaging device 105. In some implementations, the image preparation module 120 can select a portion of the image for the region of interest without user input based on automatic detection of imaging artifacts or obscuring features.

The image preparation module 120 is configured to represent the region of interest as a multiplicity of pixels. The image preparation module 120 represents regions of interest in two dimensional matrices having at least 64×64 pixels. In some implementations, the image preparation module 120 generates multiple regions of interest for each image.

Regions of interest may be overlapping, sharing portions of the image, or may be different portions of the image that do not overlap. The image preparation module 120 transmits regions of interest to the texture analysis module 125.

The texture analysis module 125 included in the image processing system 110 is configured to receive regions of interest from the image preparation module 120 and calculate textural features of the received region of interest. In some implementations the textural feature calculated by the texture analysis module is the entropy of the region of interest. The texture analysis module calculates entropy of the region of interest based on variations in intensity across pixels in the region of interest. In some implementations, the texture analysis module analyzes multiple spectral bands of the region of interest. For example, the region of interest may be an RGB image and the texture analysis module 125 analyzes textural features in one or all of the red, green and blue bands of the region of interest. In some implementations, as discussed further below, the texture analysis module calculates the Shannon entropy across pixels in one or more spectral bands of the region of interest.

In other implementations, the texture analysis module 125 is configured to compare textures of two regions of interest and the textural feature calculated by the texture analysis module 125 is relative entropy. In some such implementations, as discussed further below, the texture analysis module 125 calculates the relative entropy between different regions of interest by calculating the difference between Shannon entropies calculated for different regions of interest.

In other such implementations, discussed further below, the texture analysis module 125 performs multiscale wavelet decomposition for each region of interest. Wavelet analysis is a generalization of Fourier analysis that quantifies the degree at which pixel intensity varies at multiple scales or electronic magnifications and decomposes a signal locally according to orientation and scale, as used herein, the signal is characterized by intensity randomness at multiple scales in the region of interest. The texture analysis module 125 analyzes texture based on the degree of random fluctuation in image gray-scale intensity at multiple frequencies. An n-scale wavelet decomposition produces 3n detail subbands, three per scale, whose coefficients convey information about the fluctuation at a particular scale and orientation (one oriented horizontally, one vertically, and one diagonally). The texture analysis module 125 computes textural features from these subbands by modeling an empirical Generalized Gaussian (GG) probability density function of the coefficients obtained through wavelet decomposition in each subband. As discussed further below, the texture analysis module 125 generates a joint probability density function for each region of interest by combining the probability density functions for each subband, assuming independence across scales. The texture analysis module 125 calculates relative entropy between different regions of interests by calculating the Kullback-Leibler divergence between the joint probability density functions of the regions of interest. The calculation of the Kullback-Leibler divergence between the joint probability density functions for the regions of interest is discussed further below in reference to FIG. 5.

The texture analysis module 125 transmits the calculated textural feature to the species diversity calculator 130 included in the image processing system 110. As discussed above, in some implementations the textural feature transmitted to the species calculator 130 is the entropy of a region of interest. In other implementations, the textural feature transmitted to the species diversity calculator 130 is the relative entropy between different regions of interest.

The species diversity calculator 130 is configured to receive a calculated textural feature from the texture analysis module 125 and calculate species diversity based on the value of the textural feature and the type of textural feature. The species diversity calculator 130 correlates the value of a textural feature with reference textural feature data and species diversity data stored in the database 135. For example, the species diversity calculator 130 performs linear regression to compare the value of the textural feature with reference species diversity and textural feature values stored in the database 135 to determine the species diversity in the landscape for which the region of interest was generated. In some other implementations, the species diversity calculator 130 processes the textural feature using a mathematical function generated in advance based on a previously conducted regression analysis comparing similar image data to measured data. In some implementations, instead of applying a derived mathematical function, the species diversity calculator 130 retrieves a species diversity value from a look up table populated based on a similar regression analysis. If the specific textural feature value is not present in the lookup table, a result can be obtained through interpolation of the data in the lookup table.

The image processing system 110 includes a database 135 suitable for storing species diversity data and textural feature data, species diversity calculator functions, and/or species diversity calculator lookup tables. In some implementations, the database is made accessible via the network 115. In yet other implementations, the database 135 resides on a central server, and in other implementations, the database 135 resides on a local computer. In certain implementations, the database 135 resides over a plurality of computers. For example, species diversity data may reside on a first server and textural feature data may reside on a second server. Species diversity data can include reference species richness values and β-diversity values for various landscapes. Landscapes for which species diversity data is stored in the database 135 can include, but are not limited to, surfaces or planes of eukaryotic or prokaryotic colonies or clusters of cells, ecological landscapes, geological landscapes and landscapes consisting of planes of non-invasively imaged biological subjects. For example, the database 135 can include species diversity data for MRI images of a brain, satellite images of ecological landscapes or microscopy images of petri dishes growing cell colonies. Species diversity values included in the database can be obtained through field sampling or other non-image based techniques of measuring species diversity.

Reference β-diversity values stored in the database 135 can be calculated as the difference between the observed species richness for two different landscapes by $$\beta = \frac{\alpha_{ij}}{\alpha_i + \alpha_j - \alpha_{ij}}.$$

Species richness values for the same physical landscape at different points in time may be stored in the database 135 along with β-diversity of the landscape over time, also known as species turn-over. In some implementations, the database 135 stores regression functions or lookup tables correlating species diversity values with textural feature values for one or more categories of landscapes. Categories of landscapes can include types of landscapes. For example, microbiological cell colony landscapes, ecological landscapes further categorized by type of ecosystems, or other categories of landscapes analyzed.

The database 135 also includes textural feature data. Textural feature data includes Shannon entropy values, differences in Shannon entropy values, Kullback-Leibler divergences. The textural feature data is correlated with observed relative entropy values and observed species diversity data to allow regression analysis by the species diversity calculator 130 in order to estimate species diversity from textural features calculated by the texture analysis module 125.

Figure 2:
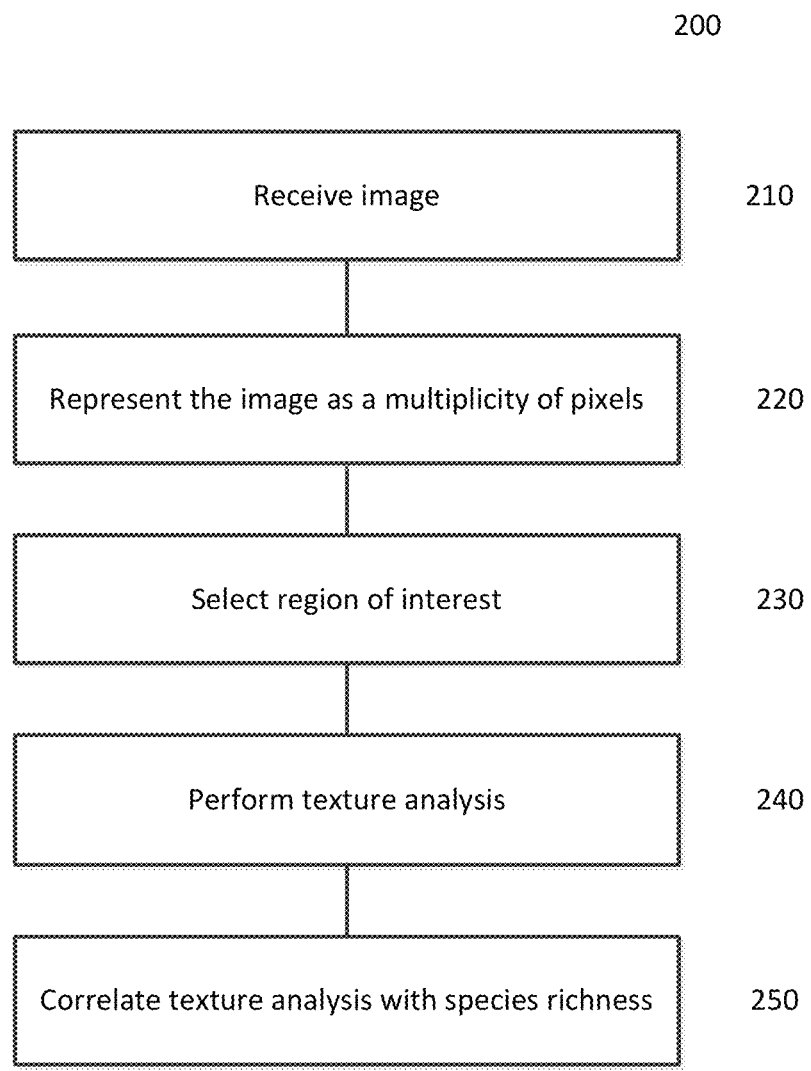
FIG. 2 is a flow chart of an example method of estimating species richness.

FIG. 2 depicts an example method 200 for measuring α-diversity, also known as species richness, by image analysis. The method 200 includes receiving an image (step 210) of a landscape to be analyzed. The image is represented as a multiplicity of pixels (step 220). A portion of the image is selected as the region of interest (step 230). The method 200 further includes performing texture analysis on the region of interest (step 240) to calculate the Shannon entropy of the region of interest and correlating the calculated Shannon entropy with α-diversity of species in the landscape analyzed (step 250).

As set forth above and referring to FIG. 1, a landscape may refer to a portion of a surface at any scale of physical space, including microscopic and macroscopic scales. The image is processed by an image preparation module 120 (step 210). In some implementations, the image is received directly from an imaging device 105. In other implementations, the image is received via a network 115 or from a local storage device.

Upon receiving the image, the image is represented as a multiplicity of pixels (step 220). In some implementations, the image is a digital image and is initially received by the image preparation module 120 as a multiplicity of pixels. In other implementations, the image is transformed to have a specific pixel density by an image preparation module 120. In certain implementations, the image preparation module 120 also performs additional initial transformations. Initial transformations may include, but are not limited to, cropping the image, reducing or increasing the image pixel density, adjusting the brightness of the image, adjusting the contrast of the image, or any combination thereof. Such transformations may be carried out or selected by a user via a user interface included in the image preparation module 120. In other implementations such transformations are performed by the image preparation module automatically.

A portion of the image is selected as a region of interest (step 230). A user may select the region of interest or, in some implementations, the region of interest is selected by the image preparation module 120. As described above in reference to FIG. 1, a portion of the image is selected as the region of interest to exclude image artifacts or obscuring features. The region of interest is a two-dimensional matrix of pixels of any size above a minimum size. For example, the minimum size of a region of interest can be 64×64 pixels.

The region of interest undergoes texture analysis (step 240) by a texture analysis module 125. Texture analysis includes calculating the Shannon entropy of one or more spectral bands of the region of interest. For example, a region of interest of an RGB image may be analyzed by calculating the Shannon entropy of one or more of the red, green or blue spectral bands of the region of interest. Alternatively, for example, the Shannon entropy of a region of interest can be calculated for only grey-scale pixel intensities. The Shannon entropy can be calculated by $$E_P(t) = -\sum_{i=1}^{S} f_i(t) \ln f_i(t),$$

The entropy is indicated by Ep(t) where S is the number of species, and f(t) is the observed sample fraction of a local community, P, belonging to the i-th species at time t.

The Shannon entropy of one or more spectral bands of the region of interest are correlated with reference species richness values and reference Shannon entropy values by regression analysis to estimate the species richness of the landscape analyzed by a species diversity calculator 130. Reference values for Shannon entropy and species richness are stored in a database 135. Shannon entropy of specific spectral bands of regions of interest may be used to estimate species richness of specific species in the landscape analyzed. For example, the Shannon entropy of the green band of a region of interest can be used to estimate the species richness of plants species in the landscape analyzed.

Figure 3:
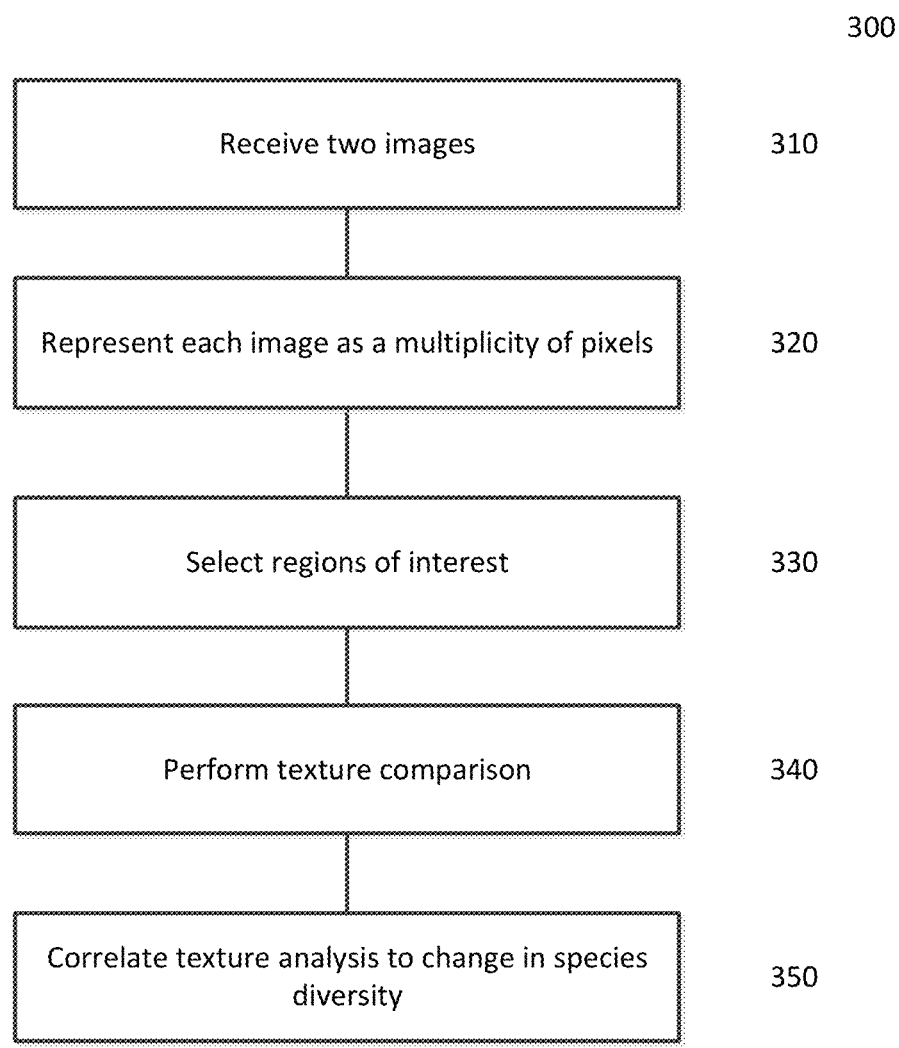
FIG. 3 is a flow chart of an example method of estimating species diversity.

FIG. 3 is a flow chart depicting an example method 300 carried out by the image processing system 110 to estimate β-diversity of species, also known as species turn-over. The method 300 includes receiving two images (step 310) of different landscapes. Each image is represented as a multiplicity of pixels (step 320). A portion of each image are selected as the regions of interest (step 330). The method 300 further includes performing texture comparison of the regions of interest (step 340) to calculate the relative entropy in pixel intensities between the regions of interest. The method 300 concludes with correlating the calculated relative entropy with β-diversity of species in the landscapes analyzed (step 350).

The method 300 begins by the image preparation module receiving two images of different landscapes (step 310). In some implementations, different landscapes are the same physical landscape at different points in time. In such implementations, the β-diversity estimated by the method 300 reflects species turn-over in the physical landscape analyzed. In other implementations, different landscapes are different physical landscapes. In such implementations, the β-diversity estimated by the method 300 reflects the β-diversity between the two physical landscapes. As mentioned above in reference to FIG. 1, a landscape may refer to a portion of a surface at any scale of physical space, including microscopic and macroscopic scales. In reference to the method 300, the two images are images of landscapes having the same or similar areas. For example, if the first landscape has an area of 100 square meters, the second landscape has an area of between 90 and 110 square meters. Each image is received by the image preparation module as described above in reference to FIG. 2 and method 200.

Each of the images are represented as a multiplicity of pixels (step 320). As discussed above in reference to FIG. 2 and method 200, the images may be received by the image preparation module 120 as a multiplicity of pixels or the image preparation module 120 may transform the images to be represented as a multiplicity of pixels. The image preparation module can perform additional transformations on the images as described above.

For each image, a portion of the image is selected as the region of interest (step 330). The regions of interest are selected to exclude image artifacts or obscuring features. In some implementations, where the images are of the same physical landscape at different points in time, the region of interest may be selected to cover the same physical space in the landscape. In other implementations, the regions of interest may be selected to cover the same or similar physical area within the respective landscapes. For example, where a first region of interest covers a physical area of 100 square meters, a second region of interest that covers a physical area of between 90 and 100 square meters can be selected from a second image. The regions of interest may be selected (step 330) by a user through a user interface included in the image preparation module 120 or the image preparation module 120 can select regions of interest (step 330) automatically. Each region of interest includes a minimum number of pixels. For example, the minimum number of pixels included in a region of interest may be 64×64 pixels.

The regions of interest are compared by texture comparison (step 340). The texture analysis module 125 calculates one or more textural features of the regions of interest and compares the textural features of two regions of interest. In some implementations, the texture analysis module 125 calculates the relative entropy between the regions of interest by calculating the difference in Shannon entropy of one or more spectral bands of each region of interest. In other implementations, the texture analysis module calculates the relative entropy between the regions of interest by calculating the Kullback-Leibler divergence between modeled probability density functions generated based on wavelet decomposition of the regions of interest.

The method 300 concludes with the species diversity calculator 130 correlating the calculated relative entropy value with a β-diversity value for species in the landscape analyzed (step 350). Calculated relative entropy values are correlated with reference β-diversity values and reference relative entropy values by regression analysis to estimate the β-diversity of species between the landscapes analyzed. Reference values for relative entropy and β-diversity of species are stored in a database 135, as discussed above in reference to FIG. 1.

Figure 4:
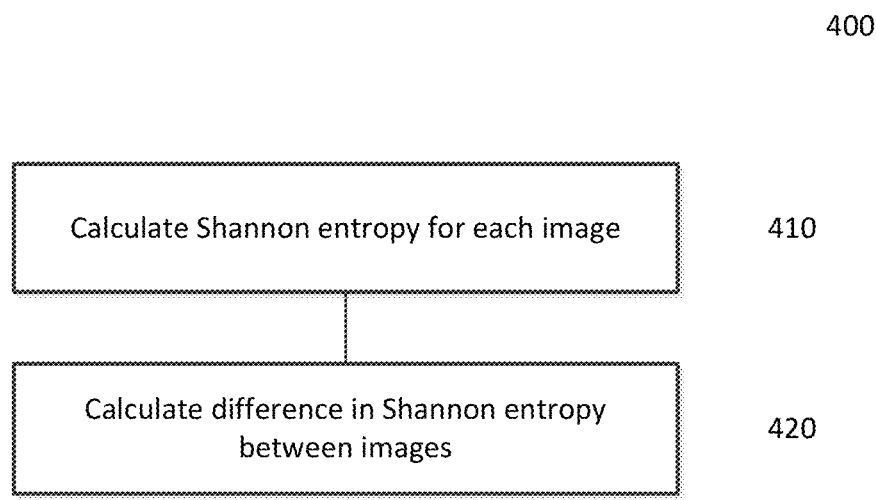
FIG. 4 is a flow chart of a first example method of performing texture comparison.

FIG. 4 depicts an example of a method 400 carried out by the texture analysis module 125 to calculate the relative entropy between regions of interest. The method 400 includes calculating the Shannon entropy of one or more spectral bands of the region of interest. The Shannon entropy of one or more spectral bands of a region of interest may be calculated to estimate species diversity of specific types of species. For example, the Shannon entropy of the green band of an RGB image of a macroscopic landscape, such as a satellite image of a conservation area, can be considered as the spectral heterogeneity, or reflectance, of plant species in water-dominated ecosystems. The blue and red bands can be considered the spectral signatures of water and soil heterogeneities in the ecosystem. Different species have different reflectance levels for different bands of the image. Higher ranges of reflectivity result in higher entropy values.

The method 400 continues with calculating the difference in Shannon entropy between different regions of interest. In some implementations, the difference in Shannon entropy is calculated between the same one or more spectral bands of the region of interest. The difference in Shannon entropy between regions of interest is expressed as a numerical value and can be expressed as an absolute value. This value is the relative entropy between the regions of interest. In some implementations, the difference in Shannon entropy value is divided by a maximum difference in Shannon entropy value to generate a relative entropy value that is normalized.

Figure 5:
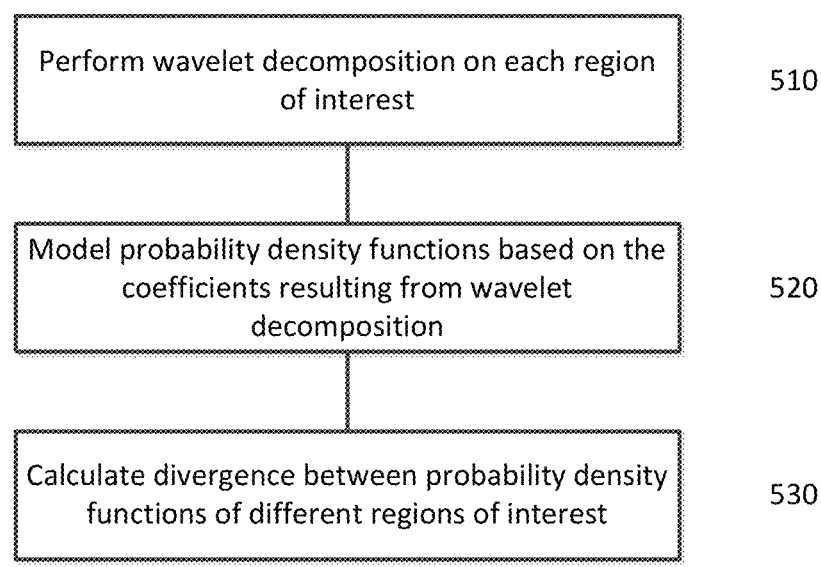
FIG. 5 is a flow chart of a second example method of performing texture comparison.

FIG. 5 depicts an example of a method 500 carried out by the texture analysis module 125 to calculate the relative entropy between regions of interest. The method 500 includes performing multiscale wavelet decomposition of the regions of interest (step 510). The method 500 also includes generation of probability density functions based on the coefficients resulting from the wavelet decompositions for each region of interest (step 520) and calculating the Kullback-Leibler divergence between probability density functions generated for different regions of interest (step 530).

The texture analysis module 125 performs multiscale wavelet decomposition on each region of interest received (step 510). The texture analysis module collects the coefficients at each scale of the decomposition. Wavelet analysis is a generalization of Fourier analysis that quantifies the degree at which pixel intensity varies at multiple scales or electronic magnifications. As wavelet analysis decomposes a signal locally according to orientation and scale, it is especially apt for modeling texture, characterized by intensity randomness at multiple scales. Texture is closely related to the degree of random fluctuation in image gray-scale intensity at multiple frequencies. An n-scale wavelet decomposition produces 3n detail subbands, three per scale, whose coefficients convey information about the fluctuation at a particular scale and orientation (one oriented horizontally, one vertically, and one diagonally). Textural features are computed by the texture analysis module from these subbands by modeling an empirical Generalized Gaussian probability density function of the coefficients in each subband.

The texture analysis module 125 generates a probability density function for each region of interest (step 520). For each scale of the wavelet decomposition, the texture analysis module 125 uses the coefficients from the wavelet decomposition to estimate the parameters of a Generalized Gaussian probability density function. The Generalized Gaussian probability density function for detail coefficients at a scale s is given by:

$$f(x_s; v_s, p_s) = \frac{p_s}{2\omega\Gamma(1/p_s)} e^{-(|x|/v_s)^{p_s}} \quad (1)$$

Here, $x_s$ is the random variable or detail coefficient at scale s, and $v_s$ and $p_s$ are the distribution width factor and shape parameter, respectively, for subband s. The location parameter (i.e. process mean) is assumed to be zero as the detail coefficients are the outputs of a high-pass filter. The Generalized Gaussian density may be used to model a wide variety of symmetric, unimodal density functions; special cases include the (standard) Gaussian ($(v,p)=(\sqrt{2}\sigma,2)$), standard Laplacian ($(v,p)=(\sigma/\sqrt{(2)},1)$), and uniform ($p \to \infty$) densities. $\sigma$ is the standard deviation, which for a Generalized Gaussian Distribution process is given by $$(GGD) \text{ is } \sigma = v \left( \frac{\Gamma(3/p)}{\Gamma(1/p)} \right)^{\frac{1}{2}}.$$

A variety of techniques exist for estimating parameters v and p, including moment-matching and maximum-likelihood.

The texture analysis module further constructs a joint probability density function for the texture of the region of interest by combining the probability density functions for the subbands of each scale of the wavelet decomposition, assuming independence across scales. For S scales, with $v=(v_1, \ldots, v_s, \ldots$ the joint probability density function is given by $$f(x; v, p) = \prod_{s=1}^{S} f(x_s; v_s, p_s) \qquad (2)$$

The method 500 concludes with calculating the divergence between the probability density functions of two regions of interest. A closed-form solution for the divergence between probability density function can be used by the texture analysis module 125. The closed-form expression for the divergence is given by $$D_{GGD}(f\|g) = \log\left(\frac{v_2 p_1 \Gamma(1/p_2)}{v_1 p_2 \Gamma(1/p_1)}\right) + \left(\frac{v_1}{v_2}\right)^{p_2} \frac{\Gamma[(p_2+1)/p_1]}{\Gamma(1/p_1)} - \frac{1}{p_1} \qquad (3)$$

In some implementations, the texture analysis module 125 compares textural features of two regions of interest calculating the difference between their respective probability density functions using the closed-form expression above.

Kulback-Leibler divergence, given by $$D_{KL}(f, g) = \int_{-\infty}^{\infty} f(x) \log \frac{f(x)}{g(x)} dx \qquad (4)$$

where f and g are the two point spread functions of different regions of interest. The divergence in Equation 3 is not symmetric, meaning that $D_{KL}(f,g) \neq D_{KL}(g,f)$. To obtain a symmetric version, the texture analysis module computes the divergence by $$D_{sym}(f, g) = \sum_{i=1}^{3n} (k_i (D_{KL}(f, g) + D_{KL}(g, f))) \qquad (5)$$

Equation 4 includes summing subbands across all 3n subbands. Values for $k_i$ are weights assigned to particular subbands i=1, . . . , 3n. In some implementations, the texture analysis module 125 sets all $k_i$=1. /in some other implementations, the weights can be used by the texture analysis module 125 to increase or decrease contribution of certain subbands to the divergence calculation. In such implementations, k values can be assigned values that are less than 1 to decrease the contribution of a subband or k values can be assigned values that are greater than 1 to increase the contribution of a subband to the divergence calculation.

The Kullback-Leibler divergence value is used as a relative entropy value. In some implementations, the Kullback-Leibler divergence value can be divided by a maximum Kullback-Leibler divergence value to generate a relative entropy value that is normalized.

Applications

The methods and systems disclosed herein can be used to assess species diversity in a variety of landscapes. Described below are various applications of the disclosed species diversity analysis.

Species Diversity Analysis in Ecological Assessment Applications

The disclosed species diversity analysis can be used to asses species richness and beta-diversity between landscapes, and species turnover in ecological landscapes. In such applications, the species can be species of plants, animals, soil types or geological formations. Water content may also be used as a defining characteristic of a species using a blue spectral band of an image analyzed. In such applications, images are acquired by satellite imaging devices or other imaging devices capable of capturing images of large areas of land. The species diversity analysis disclosed can be used to analyze any type of ecological landscape. Examples of types of ecological landscapes include, but are not limited to tropical landscapes, plains, dessert or coastal landscapes. The application of the disclosed systems and methods to analyze ecological landscapes can be used to monitor conservation areas, development of residential areas for land assessment or surveying, coastal or marine ecological communities, geological landscapes, agricultural areas for crop heterogeneity or other applications for which landscapes display a variety of species.

An example of an agricultural application includes the analysis of species richness and species turnover in a farm landscape where crop diversity is analyzed. In this example, crop diversity provides important information regarding productivity and efficiency of farming operations. Measures of species turnover and species richness by image-based analysis can provide farmers with a low-cost and efficient means of monitoring growth dynamics, invasive species, or effects of crop-contaminating afflictions such as fungal growth or insect inhabitation that can ruin production of crops. In such applications, the species being evaluated may be the biological species of crops, or species may be crops of a single biological species having different characteristics, such as plant maturity levels or presence or absence of an affliction.

An example of a geological applications includes the analysis of different geologic species that can be dependent on mineral content. Rock species display different image characteristics, such as color, depending on the mineral content of the rocks or formations. These image characteristics can be used to define species of geological formations or rocks.

Species Diversity Analysis in Microbiological Applications

The disclosed species diversity analysis can be used to asses species richness, beta-diversity between landscapes, and species turnover in microbiological landscapes. For example, field samples such as water samples, medical samples, or experimental in vitro microbiological samples can be analyzed for diversity of microbes. Species diversity data of microbial species provides measures of changes in microbiological ecosystems, efficacy of antimicrobial drug treatment, or microbial conditioning.

Microbial conditioning is commonly performed in microbiological research and in industrial applications. For example, microbial cells can be conditioned to receive DNA plasmids through the process of producing competent cells. In this process, microbial cells are conditioned to introduce pores into the membrane of the cells to allow uptake of DNA plasmids. Production of competent cells in industrial and research applications can be a time-consuming and costly process. Analysis of diversity of competency of a sample of microbial cells in a fast and efficient manner can provide a useful means of monitoring the process. Microscopic images of such microbial cells reveal textural differences in cells depending on introduction of pores into the membrane and, thus, competency of cells. These textural differences can be used to define species of cells indicating competency. The disclosed systems and methods can be used to analyze distribution of competent cells to select techniques of generating competent cells that result in greatest species turnover between landscapes of the cells before conditioning and landscapes of the cells after conditioning.

Different species of microbial cells exhibit different image features in microscopy. Samples containing a variety of microbial species can be analyzed by the disclosed systems and methods to measure species diversity in context of antimicrobial drug treatment. In the context of selective, microbe-specific, drug treatment, analysis of species turnover by image analysis provides a means of indicating drug efficacy.

Eukaryotic cells also exhibit image characteristics specific to the condition of the cells. For example, eukaryotic cells exhibit different image characteristics depending on the phase of the cell cycle that the cells are in. In research and industrial applications, cell cycle synchronization is a commonly used technique. There are many methods of synchronizing cell cycles of eukaryotic cells such as nutrient starving or chemical intervention. Cells in different phases of the cell cycle can be considered species and the disclosed methods and systems can be applied to measure cell cycle synchronization to select samples of cells that are more synchronized than others or to measure efficacy of techniques used to synchronize cells.

Species Diversity Analysis of In Situ Biological Applications

In situ analysis of biological samples can also be carried out using the disclosed systems and methods. Non-invasive medical imaging techniques commonly used in research and clinical applications to image the brain reveal pixels with varying image characteristics based on many physiological attributes of the sample. In such research and clinical applications, pixel heterogeneity can reveal useful information about such physiological attributes. Species of physiological attributes can be analyzed for diversity in such applications. For example, physiological attributes of brain regions measured by MRI, PET, SPECT, CT or other medical imaging methods include lipid content, atrophy, water content, iron content, oxygen content, or blood flow. Distribution of these physiological attributes can indicate states of neurodegenerative disease, presence of contaminants, presence and development of brain lesions or other indications. As an example, distributions of lipids in the brain have been linked to Alzheimer's disease. Medical imaging methods can reveal image characteristics that indicate variation of lipid content across brain regions. Analysis of species richness and species turnover can provide indications of Alzheimer's disease progression. Similarly, imaging characteristics, such as T2 relaxation in MRI, correlate to oxygen content in imaged brain regions and can be indicative of pathologies including cerebral hypoxia, lesions, Alzheimer's disease, and other neurodegenerative diseases. Brain regions displaying different imaging characteristics correlating to oxygen content can be considered species in the landscape of the imaged region of the brain and the species richness and species turnover analysis described herein provides a means of analyzing progression and/or prediction of the above mentioned pathologies.

Experimental Data

As indicated above, the methods and systems disclosed herein can be used to assess species diversity in a variety of landscapes. Below is the methodology and results of a study demonstrating the efficacy of the above-disclosed systems methods in analyzing α-diversity as well as β-diversity in a large area ecological landscape. Specifically, an image analysis-based approach for estimating species richness and species turnover over 28 years in wet and dry seasons in Water Conservation Area 1 (WCA 1) in the Greater Everglades Restoration Area, also known as the Arthur R. Marshall Loxahatchee National Wildlife Refuge was considered is demonstrated using Landsat images.

WCA 1 is a constructed tropical wetland. Among wetlands worldwide, the Greater Everglades Ecosystem Restoration area (GEER) has undergone the most considerable changes in ecohydrological patterns. The changes are due to the constructions of a set of levees and canals aimed to control water flow in the area. Thus, GEER is a reference wetland among ecohydrologists and environmental scientists at large.

As discussed above, changes in species richness in space and time can be assessed from multispectral imagery, using statistical multiresolution wavelet texture analysis, Kullback-Leibler divergence calculation and the calculation of Shannon entropy. The image-based analysis is demonstrated on WCA 1's ecohydrological patterns by considering interseasonal and interannual species dissimilarity, which is better known as "species turnover" or β-diversity, and species richness. As described above, the approach consists of applying wavelet decomposition, and statistically modeling then comparing these coefficients through appropriate probability density functions and calculating Kullback-Leibler divergence of such probability density functions.

Methods

Satellite Imagery

Figure 6A:
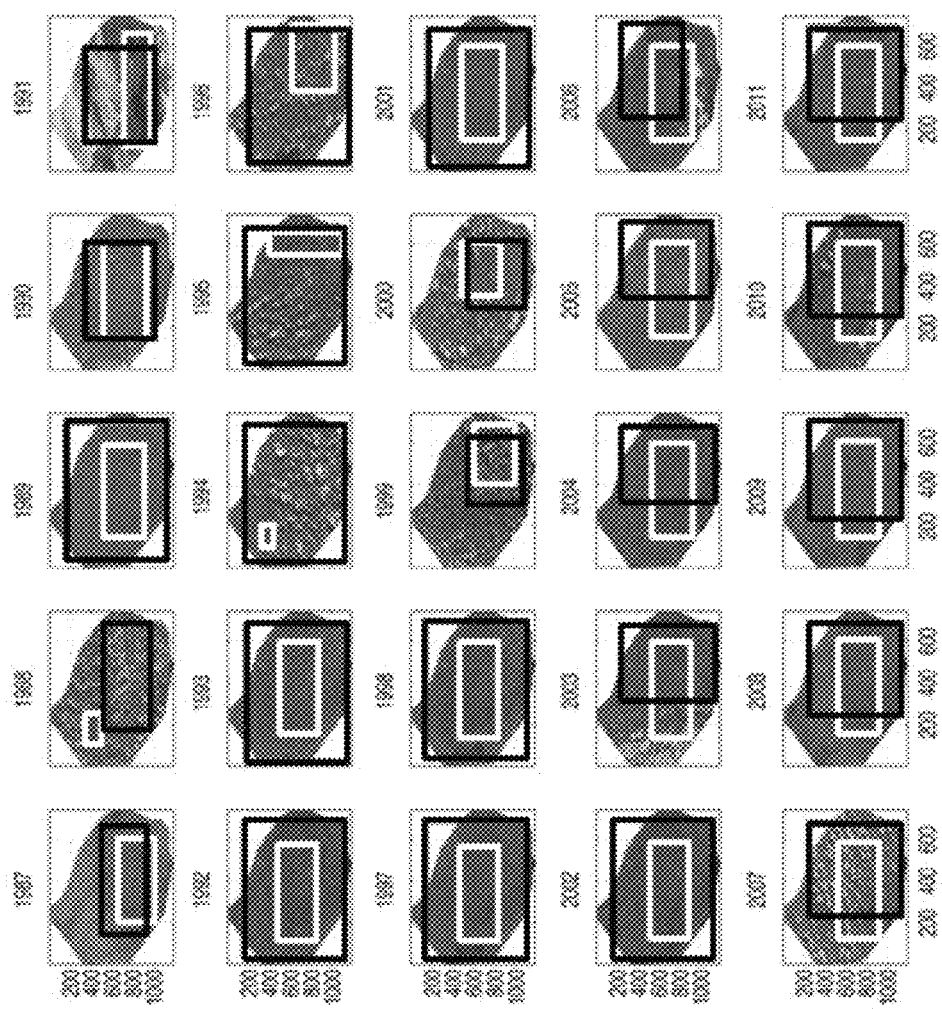
FIGS. 6A and 6B are diagrams of the sampling scheme in a water conservation area used to demonstrate the efficacy of the methods shown in FIGS. 2-4.

The satellite images of the Water Conservation Area 1 (WCA1) were taken from the Landsat database. FIG. 6A shows WCA 1 images for the 1987-2011 period in the dry and wet seasons. The resolution of these images is 30 m. The images from 1984 to 1998 were from the L4-5 TM dataset, from 1999 to 2003 from the L7 ETM+ with SLC-on (1999-2003), and from 2003 to present from the L7 ETM+ with SLC-off. The Scan Line Corrector (SLC) stopped working on May 31, 2003 and caused striping of remotely sensed images. Thus, the analysis did not consider the striped parts of these images. Each Landsat image was cropped along the boundaries of the WCA 1. Regions of interest were selected for each image, minimizing obscuring clouds. Regions of interest were selected to have a cloud cover lower than 20% on average. Two images were collected each year, one for the dry season (December-April), and one for the wet season, (May-November). Images from January and August of each year were used for the analysis. In FIG. 6A, the white squares show the regions of interest selected for texture analysis. The spectral bands for each region of interest were defined as indicated below.

Band 1: (Blue; electromagnetic wavelength: 0.45-0.52 mm), which is useful for mapping water, differentiating between soil and plants, and identifying manmade objects such as roads and buildings;

Band 2: (Green; electromagnetic wavelength: 0.52-0.60 mm), which spans the region between the blue and red chlorophyll absorption bands, and shows the green reflectance of healthy vegetation (thus vegetation that changes across seasons and years). It is useful for differentiating between types of plants, determining the health of plants, and identifying manmade objects;

Band 3: (Red; electromagnetic wavelength: 0.63-0.69 mm), which is one of the most important bands for discriminating among different kinds of vegetation. It is also useful for mapping soil type boundaries and geological formation boundaries. It is considered as a proxy of soil types.

Figure 6B:
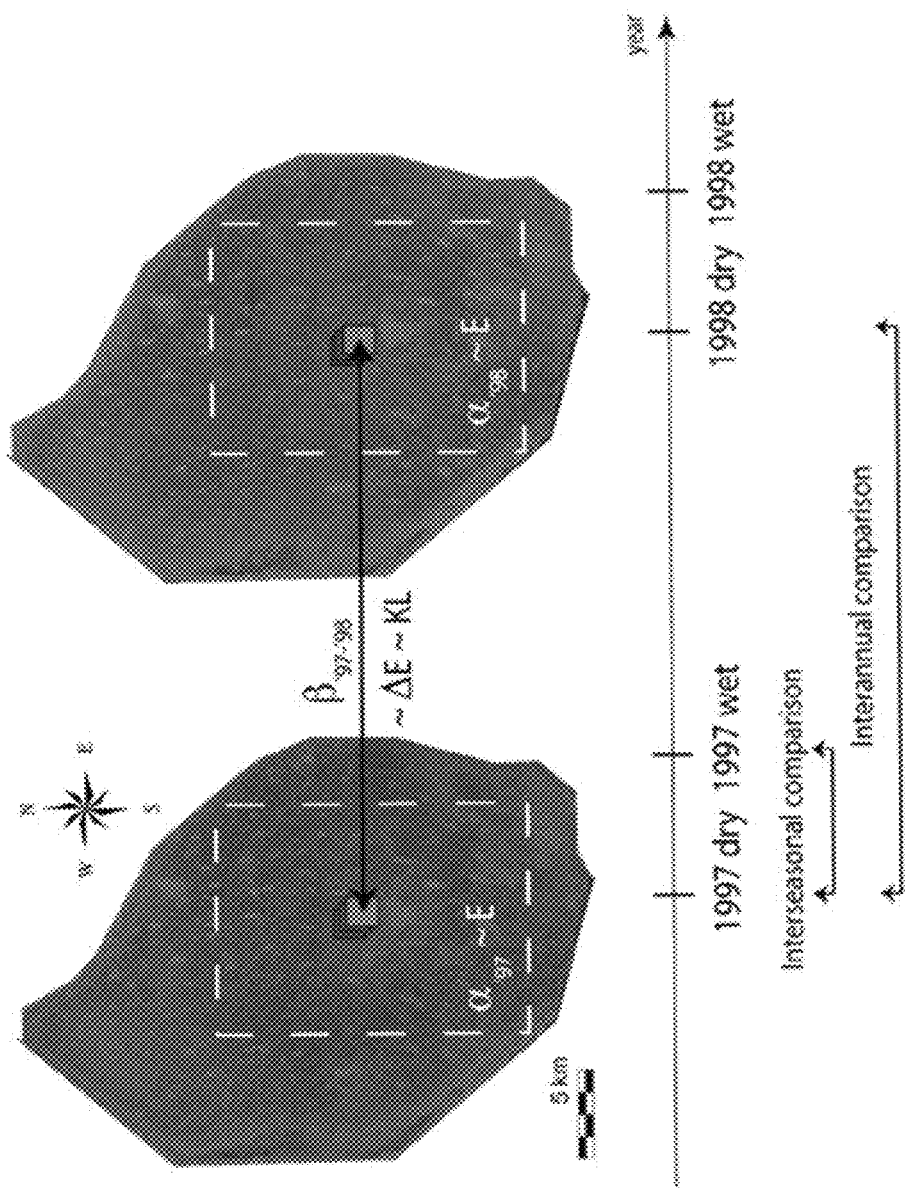

FIG. 6B provides a graphical explanation of the analysis performed for the WCA 1. Landsat images (from 1984 to 2011) were acquired for the dry and the wet season. The example depicted in FIG. 6B is for the years 1997 and 1998. The changes in vegetation composition were analyzed using α and β diversity among seasons and among years. For the inter-seasonal analysis the time-scale was, on average, six months between seasons of the same year, while for the inter-annual analysis the time-scale was about a year between the same season of different years. α and β diversity from data were compared to the calculations of the Shannon entropy and of the Kullback-Leibler divergence for the green band of the images.

Measured Species Diversity (for Use as Control Data)

The measured species richness values for WCA 1 were compiled by assembling data from fieldwork of the Global Biodiversity Information Facility database and the Comprehensive Everglades Restoration Project (CERP) database. In order to compare the image-based estimations of species richness, such as those obtained from the analysis of the green band of Landsat images, a species richness matrix was generated having 30 m² resolution from the aforementioned sources. The measured species richness values for plant communities were generated from the Global Biodiversity Information Facility (GBIF) data that provides occurrences of species in space and time at 1 km resolution. The black squares in FIG. 6 indicate the regions where the GBIF data were available. Data from 1984 to 2011 such as for the Landsat images was considered. For the GBIF data, we downscaled the information of species richness from 1 km² to 30 m² using a simple coarse-graining algorithm. A grid of smaller squares was created and the number of species were counted at the resolution of the smaller grid. The measured species richness values were also refined with point data for plant species occurrences from CERP zone date. CERP zone data were available from 2001 onward. In addition, measured species richness values were refined with the fieldwork data from Childers et al 2003 (Childers D, Doren R, Jones R, Noe G, Rugge M, et al. (2003) Decadal change in vegetation and soil phosphorus pattern across the everglades landscape. J Environ Qual 32).

As an example, a total of 30 plant species were found along the Loxahatchee National Wildlife Refuge transect which goes from the western most to the easternmost boundary of WCA1 at its maximum width. According to Childers et al 2003 the species richness at a given site never exceeded 8 m⁻². Of these 30 species, only 11 were found in both 1989 and 1999.

The species richness data of the above-mentioned sources was combined into a grid covering WCA 1 in which the unitary pixel represented an area of 30 m². The measured species richness values were calculated by the sum of unique species in each pixel, and the average local measured species richness of WCA 1 was calculated by taking the average of all of the species richness values at individual pixels.

Measured species turnover, or β diversity, was calculated using the data of GBIF (GBIF (2012) Global biodiversity information facility. Technical report, Global Biodiversity Information Facility. http://www.gbif.org/; Accessed 2012) as complementary to the Jaccard Similarity Index (JSI) evaluated in time at resolution of 30 m². JSI is given by the ratio of the number of common species in two pixels and the number of all species in both pixels. Specifically, $$\beta = \frac{\alpha_{ij}}{\alpha_i + \alpha_j - \alpha_{ij}},$$

where $\alpha_i$ and $\alpha_j$ are the numbers of species present in pixel i and j at different seasons or years.

Image-Based Estimates of Species Diversity

Landsat RGB imagery, despite its low resolution, reveals information about the spatiotemporal structure of ecosystem components. High resolution imagery is not always available for free for all the regions in the world. Moreover, imagery of higher quality does not always guarantee better estimation of biodiversity variables. This is particularly true in tropical ecosystems where the resolution of high quality imagery can be too small compared to the extent of each single species. Methodologies for assessing biodiversity of ecosystems described herein can overcome the low quality of imagery such as the Landsat imagery.

Species Richness—Shannon Entropy

The Shannon entropy of the green band was considered the spectral heterogeneity, or reflectance, of plant species in water-dominated ecosystems. The blue and red bands were considered the spectral signatures of water and soil heterogeneities in the ecosystem. Different species have different reflectance levels for different bands of the Landsat images. Higher ranges of reflectivity result in higher calculated entropy because there are more plant species with different degree of reflectivity. In ecology there is discussion surrounding the opinion that different reflectance levels do not always characterize different species, but "functional species". The distinction between species diversity and functional species diversity is a longstanding issue in ecology. In this experiment we refer to "species" rather than "functional species;" nonetheless, we make clear that similar reflectance levels may characterize functional species or vegetation types (within the same spectral group) rather than the same species. No distinction is made here between invasive and endemic species; however, in some situations, variation of species richness can also be attributed to the invasion of non-native species and inform species management. Other sources of variation in surface reflectance, such as directional effects and shadowing, are also sources of texture variations in Landsat images. Nonetheless, the disclosed methodology is capable of detecting the average texture generated by species differences. Shannon entropy of the green spectral band was calculated, as described above in reference to step 240 of FIG. 2, for the regions of interest indicated in FIG. 6. Shannon entropy was calculated for images acquired from years 1984 through 2011.

Species β-Diversity Based on Difference in Shannon Entropy

The difference in calculated Shannon entropy values for the green band of images were calculated between seasons. A plot of relative entropy values, based on Shannon entropy difference values, correlated with measured species turnover values was produced (plot shown in FIG. 8). To produce the plot, Shannon entropy difference values were normalized by dividing the difference of Shannon entropy values by a maximum difference in Shannon entropy value to generate relative entropy values.

Species β-Diversity Based on Kullback-Leibler Divergence

Joint probability density functions for individual regions of interest were generated as described above in reference to FIG. 5. Kullback-Leibler divergence values between seasons and between years were calculated for the green band of Landsat images from years 1984 through 2011 by the below equation (Equation 4) as described above in reference to FIG. 5.

$$D_{sym}(f, g) = \sum_{i=1}^{3n} (k_i(D_{KL}(f, g) + D_{KL}(g, f)))$$

Figure 8:
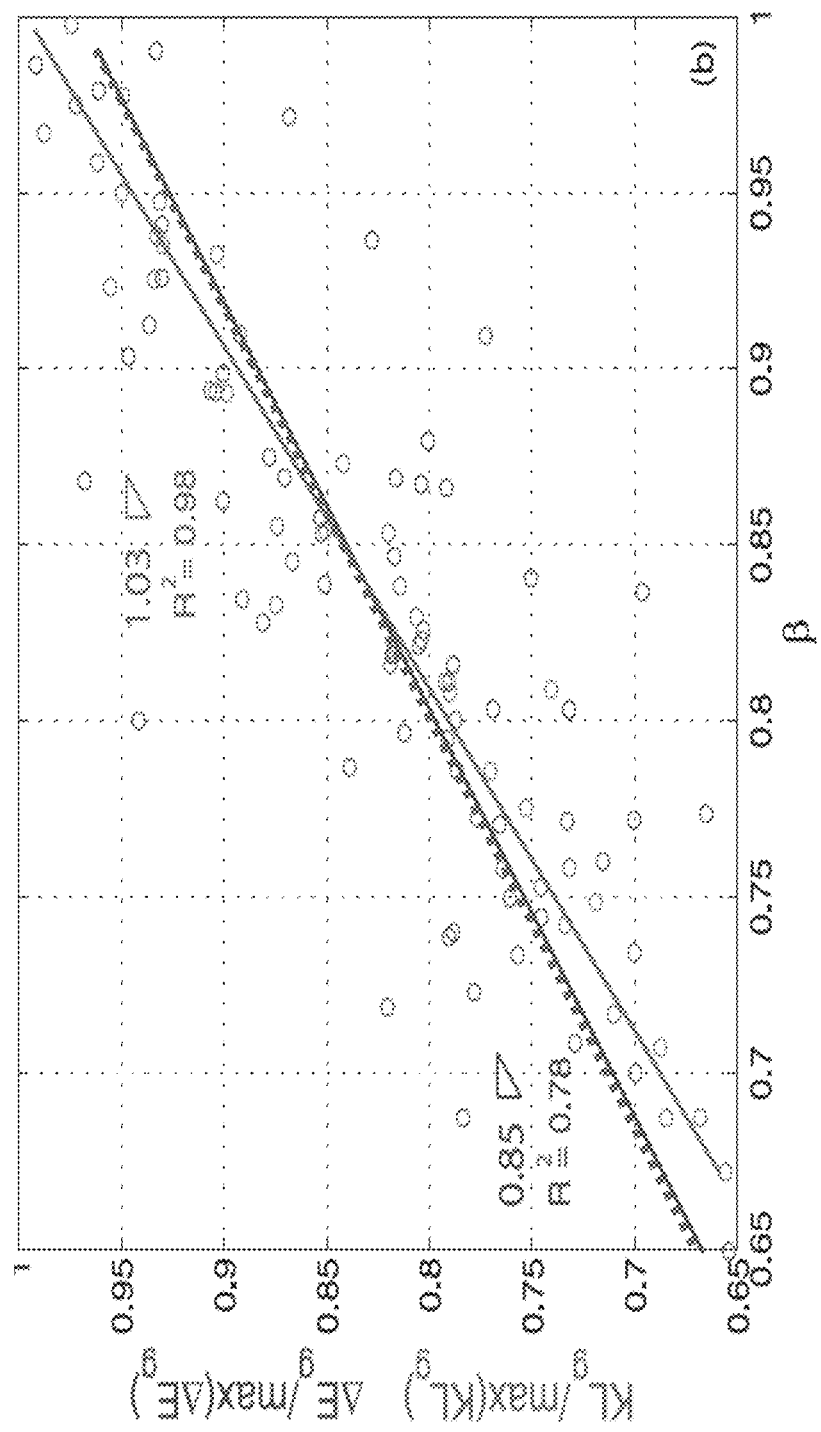
FIG. 8 is a chart depicting plots comparing empirically measured species turnover and image-based species turnover estimation.

A plot of relative entropy values, based on Kullback-Leibler divergence values, correlated with measured species turnover values was produced (plot shown in FIG. 8). To produce the plot, Kullback-Leibler divergence values were normalized by dividing the Kullback-Leibler divergence values by a maximum Kullback-Leibler divergence value to generate relative entropy values.

Results

Figure 7:
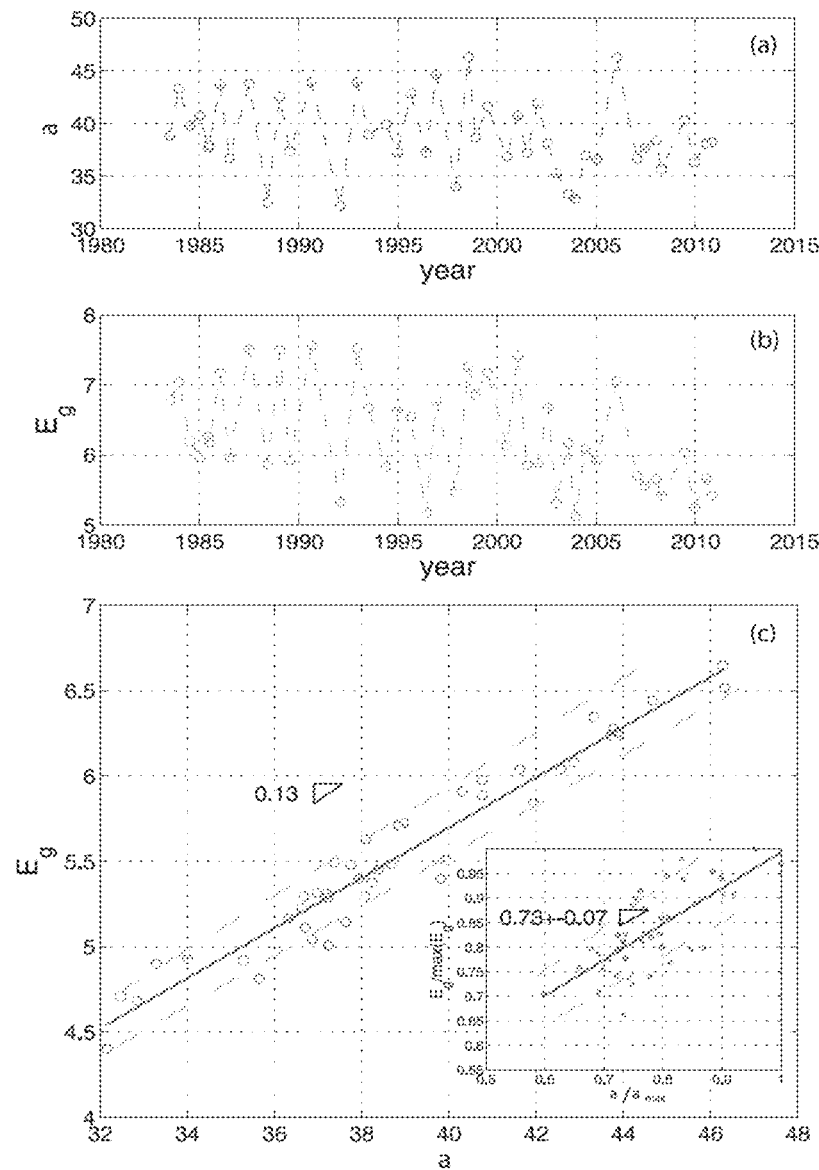
FIG. 7 shows a series of plots comparing empirically measured species richness and image-based species richness estimation.

The measured species richness values for the WCA1 are plotted as a function of time in FIG. 7 (a). The Shannon entropy values for the green band of the regions of interest in the Landsat images are plotted as a function of time in FIG. 7 (b). FIG. 7 (c) is a plot of the functional relationship between the Shannon entropy of the green band and the measured species richness for WCA 1. The inset, which reports the normalized entropy, shows the ability of the Shannon entropy to capture at least 70% of the measured local species-richness. These percentages are 80% and 77% in the dry and wet season, respectively. The dashed curves are the 95% confidence interval of the linear regression exponent. Variability of measured exponents are found by bootstrapping over points and deriving slopes by the linear and the Jackknife models. A strong correlation between calculated Shannon entropy and measured species richness was observed. As such species richness can be estimated by Shannon entropy and linear regression analysis.

FIG. 8 is a plot showing the correlation between measured species turnover and the difference of the Shannon entropy between seasons as well as Kullback-Leibler divergence between seasons. The best-fit line of the difference in Shannon entropy between seasons is depicted as the dashed line. The best-fit line of the Kullback-Leibler divergence between seasons is depicted as the solid line. The error in the estimation of the regression coefficient is +0.04. The $R^2$ values are the coefficients of determination. The $R^2$ value of the correlation between measured species turnover and the difference in Shannon entropy between seasons was 0.78 and the $R^2$ value of the correlation between measured species turnover and the Kullback-Leibler divergence between seasons was 0.98. Variability of measured exponents are found by bootstrapping over points and deriving slopes by the linear and the Jackknife models. A strong fit of the regression coefficient is indicated for the Kullback-Leibler divergence as well as the difference in Shannon entropy between seasons correlated with measured species turnover. As such estimation of species turnover by regression analysis of Kullback-Leibler divergence as well as difference in Shannon entropy are both robust methods.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific implementations of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

What is claimed:

1. A system for measuring species diversity, comprising:
a memory storing processor executable instructions; and
one or more processors coupled to the memory, wherein execution of the processor executable instructions by the one or more processors causes the one or more processors to:
receive a first image of a first landscape;
receive a second image of a second landscape;
represent a portion of the first image as a first region of interest comprising a multiplicity of pixels, and
represent a portion of the second image as a second region of interest comprising a multiplicity of pixels;
calculate at least one textural characteristic of two or more spectral bands of each region of interest; and
calculate the species diversity between the first landscape and the second landscape based on the textural features.

2. The system of claim 1, wherein calculating at least one textural characteristic of each region of interest comprises performing a multi-scale wavelet decomposition on the regions of interest.

3. The system of claim 2, wherein calculating at least one textural characteristic of each region of interest comprises generating a probability density function of pixel intensities in the regions of interest based on the multi-scale wavelet decomposition.

4. The system of claim 3, wherein calculating the species diversity comprises calculating the Kullback-Leibler divergence between probability density functions of pixel intensities in the regions of interest.

5. The system of claim 4, wherein calculating the species diversity comprises correlating the Kullback-Leibler divergence with species beta-diversity by regression analysis using species diversity data.

6. The system of claim 1, wherein calculating at least one textural characteristic of each region of interest comprises calculating the Shannon entropy of the two or more spectral bands of each region of interest.

7. The system of claim 6, wherein calculating the species diversity comprises calculating the difference between calculated Shannon entropy of each region of interest.

8. The system of claim 7, wherein calculating the species diversity comprises correlating the difference between calculated Shannon entropy of each region of interest with species diversity data by regression analysis.

9. The system of claim 1, wherein receiving a first image of a first landscape comprises receiving a first image of a microscopic landscape containing multiple species of eukaryotic or prokaryotic cells, and receiving a second image of a second landscape comprises receiving a second image of a microscopic landscape containing multiple species of eukaryotic or prokaryotic cells.

10. The system of claim 1, wherein receiving a first image of a first landscape comprises receiving a first satellite image of an area of land, and receiving a second image of a second landscape comprises receiving a second satellite image of an area of land.

11. The system of claim 1, wherein receiving a first image of a first landscape comprises receiving a first medical image of a brain, and receiving a second image of a second landscape comprises receiving a second medical image of a brain.

12. The system of claim 1, wherein receiving a first image of a first landscape comprises receiving a first image of a landscape at a first point in time, and receiving a second image of a second landscape comprises receiving a second image of the landscape at a second point in time.

13. A method of measuring species diversity, comprising:
receiving a first image of a first landscape;
receiving a second image of a second landscape;
representing a portion of the first image as a first region of interest comprising a multiplicity of pixels;
representing a portion of the second image as a second region of interest comprising a multiplicity of pixels;
comparing at least one textural characteristic of two or more spectral bands of the first region of interest and the second region of interest; and
calculating the species diversity between the first landscape and the second landscape based on the comparison of the at least one textural features of the regions of interest.

14. The method of claim 13, wherein calculating at least one textural characteristic of each region of interest comprises performing a multi-scale wavelet decomposition on the regions of interest.

15. The method of claim 14, wherein calculating at least one textural characteristic of each region of interest comprises generating a probability density function of pixel intensities in the regions of interest based on the multi-scale wavelet decomposition.

16. The method of claim 15, wherein comparing textural features comprises calculating the Kullback-Leibler divergence between probability density functions of pixel intensities in the regions of interest.

17. The method of claim 16, wherein calculating the species diversity comprises correlating the Kullback-Leibler divergence with species beta-diversity by regression analysis using species diversity data.

18. The method of claim 13, wherein comparing at least one textural characteristic of two or more spectral bands of each region of interest comprises calculating the Shannon entropy of the two or more spectral bands of each region of interest.

19. The method of claim 18, wherein comparing textural features comprises calculating the difference between calculated Shannon entropy of each region of interest.

20. The method of claim 19, wherein calculating the species diversity comprises correlating the difference between calculated Shannon entropy of each region of interest with species diversity data by regression analysis.

21. The method of claim 13, wherein receiving a first image of a first landscape comprises receiving a first image of a microscopic landscape containing multiple species of eukaryotic or prokaryotic cells, and receiving a second image of a second landscape comprises receiving a second image of a microscopic landscape containing multiple species of eukaryotic or prokaryotic cells.

22. The method of claim 13, wherein receiving a first image of a first landscape comprises receiving a first satellite image of an area of land, and receiving a second image of a second landscape comprises receiving a second satellite image of an area of land.

23. The method of claim 13, wherein receiving a first image of a first landscape comprises receiving a first medical image of a brain, and receiving a second image of a second landscape comprises receiving a second medical image of a brain.

24. The method of claim 13, wherein receiving a first image of a first landscape comprises receiving a first image of a landscape at a first point in time, and receiving a second image of a second landscape comprises receiving a second image of the landscape at a second point in time.

* * * * *